Feb. 13, 1951          C. S. DAVIDSON          2,541,213
MAGNETOMETER
Filed Oct. 10, 1947
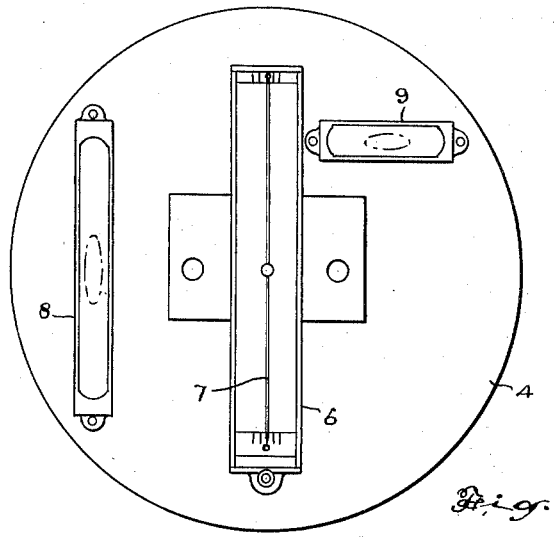
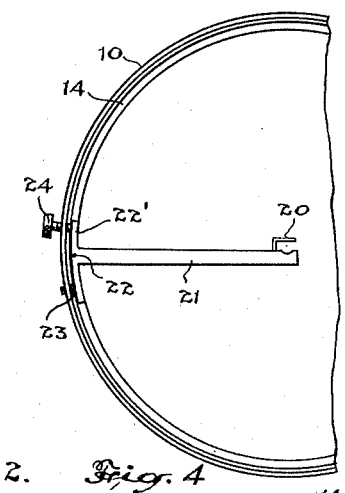
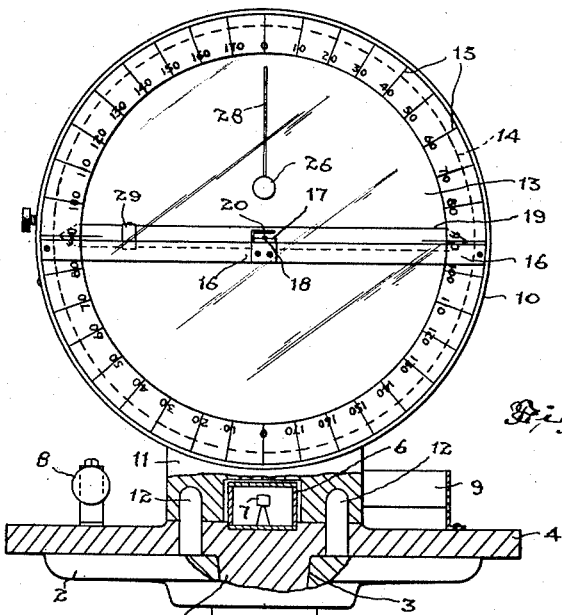
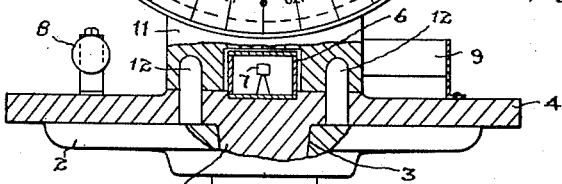
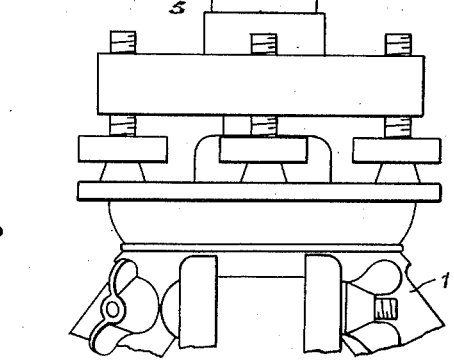
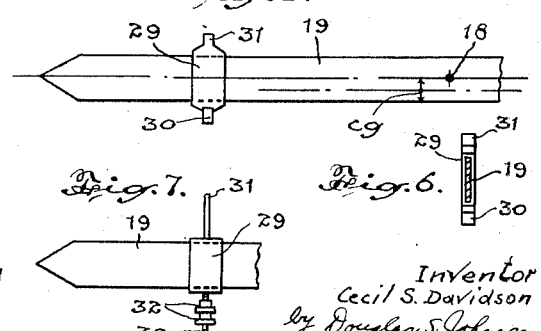
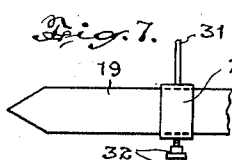
Inventor
Cecil S. Davidson
by Douglas S. Johnson Patented Feb. 13, 1951

2,541,213

UNITED STATES PATENT OFFICE 2,541,213

MAGNETOMETER

Cecil Stanley Davidson, Sudbury, Ontario, Canada

Application October 10, 1947, Serial No. 779,103

3 Claims. (Cl. 175—183)

This invention relates to improvements in vertical magnetometers particularly adapted for geological exploration work and the principal object of the invention is to provide a rugged and easily operated instrument which will delineate structures of varying magnetic intensity in which the magnetic needle is capable of being adjusted for balance for various magnetic latitudes and will have the desired sensitivity which will remain substantially constant independent of temperature variations for a given adjustment of the needle.

A further and important object is to provide a magnetometer in which the sensitivity will not only remain constant independent of temperature variations for a given adjustment of the magnetic needle but the sensitivity of the needle can be altered within adjustable desirable limits thereby permitting the measurement of large as well as small anomalies in the vertical field without the employment of auxiliary magnets.

A further object is to devise an instrument by means of which curves of sensitivity for different settings can be determined, and which can be readily calibrated so that readings can be recorded in gammas, the magnetic units employed in the use of magnetometers.

The principal feature of the invention consists in providing a magnetic needle, mounted to swing in a vertical plane with counter-balancing means adapted to be moved longitudinally thereof, and temperature actuated compensating means for altering the centre of gravity of the needle in accordance with the alterations of the magnetic moment of the needle due to temperature variations to maintain the sensitivity of the needle substantially constant independent of temperature changes.

A further important feature consists in providing adjustable means for changing the centre of gravity of the magnetic needle relative the axis thereof to alter the sensitivity of the needle, the temperature compensating means thereafter maintaining the needle sensitivity substantially constant independent of temperature variations.

A further feature of importance consists in providing an instrument equipped with a rotatable base having a compass and spirit levels, upon which a graduated vertical dial is mounted to indicate the movements of the needle in a vertical plane.

In the accompanying drawings,

Figure 1 is a vertical elevation in part section of an instrument embodying the present invention.

Figure 2 is a plan view of the rotatable table for supporting the magnetometer showing the arrangement of compass and spirit levels for determining its position.

Figure 3 is a vertical mid-section taken through the magnetometer at right angles to the position shown in Figure 1.

Figure 4 is a detail part vertical sectional view showing the means for raising the needle off its bearings.

Figure 5 is an enlarged detail of one end of the magnetic needle showing the adjustable temperature compensated counterbalance.

Figure 6 is an end view of the magnetic needle showing the adjustable counterbalance illustrated in Figure 5.

Figure 7 is a view similar to Figure 5 but showing an alternative form of temperature compensated counterbalance in which the counterbalance incorporates a centre of gravity adjustment.

In the form of the invention herein shown a suitable tripod 1 equipped with the usual leveling adjustments is provided with a flange 2 having a central tapered recess 3.

A table 4 rotatably mounted on the flange 2 is provided with a tapered centering pin 5 fitting the recess 3.

Centrally mounted on the table 4 within the casing 6 is a compass needle 7 for adjusting the table 4 to the magnetic meridian. The compass needle and case are readily removable if desired.

Suitable spirit levels 8 and 9 are mounted on the table 4, one parallel with the compass and meridian diameter of the table and the other at right angles thereto.

A ring 10 of non-magnetic material is provided with a base block 11 having pin holes adapted to receive the positioning pins 12 mounted in the block 4 and is further provided with plates 13 of suitable transparent heat-resisting material sealed in the opposite edges of said ring.

The ring 10 is formed with a narrow annular rib 14 against the outward edges of which are secured annular scale rings 15 on the outer faces of which are arranged graduations.

A pair of narrow parallel bars 16 extend across the ring 10 slightly below the transverse diameter and are secured at the ends to the rib 14.

Adjustably mounted on the bars 16 mid-way of their length are suitable bearings 17 which are preferably quartz or agate and are adapted to support the bearing pin 18 of the magnetic needle 19. Suitable stop guards 20 extend above the bearings 17 to limit the upward movement of the needle bearing pin when it is lifted off its bearings when not in operation.

A pair of bars 21 of non-magnetic material coupled at their outer ends are pivotally mounted on a pin 22 secured in the rib 14, the inward ends thereof being notched to receive the needle bearing pin 18 and these bars are adapted to lift the bearing pin and hold it against the guards 20 when not in operation. The bars 21 are formed with an angularly disposed extension 22' at the outer ends which is engaged by a small spring 23 to raise same to lift the needle, and a thumb screw 24 threaded in the ring 10 is arranged to engage the end of the extension to lower the arms and place the bearing pin on its bearings in position to operate.

It will be noted that the outer ends of the magnetic needle swing between the rings 15 and as the needle swings an inductive effect is produced which dampens or retards the movement of the needle and prevents too long continued oscillation or "hunting" when the needle is released.

For the sake of speed the magnetic needle is read "on the swing" from the zero position, but the dampening effect may be increased to bring the magnetic needle quickly to rest by adjusting the size and position of the rings 15 within desirable limits.

A spindle 25 slidably and rotatably mounted in one of the glass plates 13 and provided with a thumb nut 26 at its outer end is held in an inoperative position by a coil spring 27 and on the inner end of the spindle is mounted a cranked wire 28 which is adapted, when the spindle is pressed inwardly and turned, to engage the locked needle and to bring it to any desired position before release.

The magnetic needle 19 is a thin flat bar magnet which may be steel or an alloy combining high magnetic susceptibility and retentivity, and slidably mounted on one end thereof is a counterbalance 29 preferably in the form of a thin non-magnetic sleeve. This counterbalance may be moved longitudinally on the needle bar to counterbalance same so that it will assume a true horizontal position when at rest on its bearings and subject to normal earth magnetic forces.

Secured to one edge of the counterbalance or counter-weight 29 and extending downwardly therefrom below the needle, as illustrated in Figures 5 and 6, is a small stud 30 of Invar or other material having a low coefficient of expansion, while arranged on the opposite edge of the counterbalance is a second small stud 31 of aluminum or other material of a high coefficient of expansion. These studs are so arranged that the centre of gravity of the needle and counterbalance lies below the pivot centre of the needle, reducing the sensitivity of the needle to variations in magnetic pull so that the needle in the horizontal balance condition which is assumed when the magnetic pull thereon is exactly balanced by the counter-weight 29 will not be unstable which would be the case if the centre of gravity of the needle assembly was coincident with its pivot centre as will be hereinafter explained. The sensitivity of the needle is thus substantially inversely proportional to displacement of the centre of gravity of the needle assembly below its pivot centre.

A further factor influencing the sensitivity of the needle is temperature, for it is well known that the strength or magnetic movement of a bar magnet changes with temperature, increasing when cold and decreasing when hot. Thus the provision of the studs 30 and 31 of different coefficients of expansion and their arrangement on the counterbalance 29 is extremely important providing a compensating means to correct for temperature variations for as the temperature increases weakening the magnetic moment of the magnet the upper aluminum stud 31 having a high coefficient of expansion will expand, raising the centre of gravity of the needle assembly and hence increasing its sensitivity to compensate for the loss of magnetic moment.

In the event the temperature falls increasing the magnetic moment of the needle, the stud 31 will contract, lowering the centre of gravity of the needle assembly decreasing the sensitivity thereof and compensating for the increased magnetic moment. The Invar stud 30 having a very low coefficient of expansion will remain substantially unaffected by the temperature variations.

In Figure 7 the Invar stud 30 is shown in the form of a threaded spindle and on this spindle are mounted a pair of small threaded nuts 32 which may be locked together in any desired position of adjustment. Altering the position of the nuts 32 will of course change the centre of gravity of the needle assembly.

It will be understood that if a magnetic needle is allowed to swing freely in the magnetic meridian it will line itself to the total earth magnetic field. In certain latitudes the needle will be inclined downwardly toward the north. If the axis of the needle is turned 90° so that the plane of motion is perpendicular to the magnetic meridian it will assume a vertical position, as only the vertical component of the earth's magnetic field is effective.

If a magnetic needle is placed so that the plane of motion is perpendicular to the magnetic meridian on assumed frictionless bearings with a counter-weight on the axis of the needle of sufficient weight to exactly balance the needle at 90° to the earth's vertical magnetic component, the needle would be in a horizontal position. If such result were achieved and if the centre of gravity of the needle system lay on the axis of the needle through the pivots then the equilibrium would be unstable and any change in magnetic intensity would cause the position of rest of the needle to alter 90°. However, if the counter-weight 29 carrying the studs 30 and 31 to lower the centre of gravity of the mass of the needle to a desirable point below the axis of the needle is adjusted laterally along the axis of the magnetic needle, the needle can be balanced for various magnetic latitudes and will have the desired sensitivity. Where the stud 30 is threaded, the nuts 32 can be adjusted as desired to change the sensitivity of the needle assembly by altering its centre of gravity so that any given increase or decrease in the vertical component of the earth's magnetic field causes the desired change in angular position of the needle.

It will be understood that once the sensitivity of the needle assembly has been determined it will remain substantially constant independent of temperature variations with the expansion and contraction of the aluminum stud 31 shifting the centre of gravity of the needle assembly to compensate for temperature produced changes of magnetic moment of the magnetic needle.

In the practical field use of an instrument such as described the instrument is set up in a desired locality and after being properly levelled the magnetic meridian is determined by the compass on the rotating table 4. The table and compass are then locked, the compass being removed if desired, and the magnetometer ring 10 when placed in position on the table will be at 90° to the magnetic meridian. It will be desirable to take two readings both normal to meridian to compensate for slight errors in orientation, the instrument being rotated 180° between readings. This method of setting is rendered simple by having the instrument provided with heat resistant glass or other transparencies on both sides.

It should be noted that if the locked directional compass 7 is left on the tripod during the reading of the magnetometer it will be necessary to provide means for relocking the compass to within 1/1000" in order not to affect the magnetometer readings beyond the desired error limit.

The needle having been balanced by manipulating the counterbalance in a normal field as described, is set in position, if necessary for the case in hand, by the spindle 25 being pressed inward and turned to bring the cranked inner end of the wire 28 to engage the locked needle and swing it to any desired position. The needle is then lowered on to its bearings by operating the bar 21 through manipulating the screw 24 and swings freely to a position to indicate on the graduated scale the degrees of deviation affected by magnetic conditions of the earth at the point of location.

With an instrument constructed as described the sensitivity automatically varies according to the relation between the position of the centre of gravity and the point of support of the needle. For simplicity of consideration, the mass of the magnet needle taken as concentrated at the centre of gravity, which is somewhat toward the south end and a little below the axis of the needle, may be assumed to be replaced by an equal mass lying on the axis of the needle, and another equal mass directly under and a little below the pivots. When the needle in a plane perpendicular to the magnetic meridian is balanced at right angles to the normal vertical earth's magnetic field in any locality, it is also normal to the pull of gravity and hence the counter-turning moment due to the effective mass below the point of support, is at a minimum. This effective mass below the point of support is due to a resultant centre of gravity somewhat below the pivots.

As the vertical magnetic field changes, through an increase or decrease, changing the position of rest of the magnetic needle, the counter-turning moment of the effective mass is initially below the pivots in relation to the point of support increases and the sensitivity is automatically dampened. Actually the increase or decrease in vertical magnetic force is proportional to the tangent of the angle of deflection.

A condition such as described is highly desirable as the sensitivity is near a maximum for minor variations in the vertical magnetic field and decreases for larger variations, thus permitting the measurement of large anomalies without the necessity of employing auxiliary magnets which greatly facilitates rapid field operation.

It should further be noted that the same needle system with suitably placed counterweight 29 carrying studs 30 and 31 and suitably chosen nuts 32, as shown in Figure 7, could be used to measure variations in the horizontal component of the earth's magnetic field.

In this latter case the needle would be oriented to swing in the magnetic meridian plane and nuts 32 would be chosen of such a weight that the needle would be caused to stand vertically N pole up, at locations of normal horizontal magnetic intensity, with the spindle 30 projecting in the south direction.

The whole counterweight assembly 29, 30 and 31 in the case of Figures 5 and 6 and including the nuts 32 in the case of Figure 7 could be shifted toward or away from the pivots until the resulting centre of gravity of the vertically positioned oriented needle is to some extent below and to the southward of the pivots. The same reasoning as above as to sensitivity, etc., would apply except that a change in sensitivity for any given setting would be brought about by a slight shift of the whole assembly longitudinally of the needle.

What I claim as my invention is:

1. In a vertical magnetometer, the combination with a scaled dial and a magnetic needle mounted to swing in a vertical plane, of a counterbalance slidably mounted on said needle, a member having a low coefficient of expansion mounted on said slidable counterbalance and extending below said needle, and a member having a high coefficient of expansion mounted on said slidable counterbalance and extending above said needle said low and high coefficient members effecting a variation in the position of the centre of gravity of said needle perpendicular to the axis thereof with change in temperature to compensate for variations in magnetic moment of said needle under temperature variations, said compensation being substantially independent of the sensitivity of said needle as determined by the position of said counterbalance.

2. In a vertical magnetometer, the combination with a scaled dial and a magnetic needle mounted to swing in a vertical plane, of a counterbalance slidably mounted on said needle, an Invar stud extending downwardly from said slidable counterbalance below the needle, and an aluminum stud extending upwardly from said slidable counterbalance in opposed relation to said Invar stud.

3. In a vertical magnetometer, the combination with a scaled dial and a magnetic needle mounted to swing in a vertical plane, of a counterbalance slidably mounted on said needle, a threaded spindle having a low coefficient of expansion extending downwardly from said slidable counterbalance below the needle, a stud having a high coefficient of expansion extending upwardly from said slidable counterbalance above the needle, and a weight threaded on said spindle.

CECIL STANLEY DAVIDSON.

REFERENCES CITED

The following references are of record in the file of this patent:

UNITED STATES PATENTS

| Number | Name | Date |
| --- | --- | --- |
| 1,909,619 | Herrick | May 16, 1933 |
| 1,943,850 | Truman | Jan. 16, 1934 |
| 2,010,245 | Roux | Aug. 6, 1935 |

FOREIGN PATENTS

| Number | Country | Date |
| --- | --- | --- |
| 1,754 of 1889 | Great Britain | June 22, 1889 |
| 380,720 | Germany | Sept. 12, 1823 |